Oct. 6, 1942.  F. S. FLOETER  2,298,082
BACK REST CARRIAGE FOR LATHES
Filed May 16, 1941

INVENTOR
FREDERICK S. FLOETER
BY
ATTORNEY

Patented Oct. 6, 1942

2,298,082

UNITED STATES PATENT OFFICE 2,298,082

BACK REST CARRIAGE FOR LATHES

Frederick S. Floeter, Saginaw, Mich., assignor to Wickes Bros., Saginaw, Mich., a corporation of Michigan Application May 16, 1941, Serial No. 393,739

2 Claims. (Cl. 82—38)

This invention relates to lathes for turning shaft bearings such as line and pin journal bearings for engine crank-shafts and the like. More particularly, the improvement is adapted to be incorporated in conventional lathes in which a cross-feed tool slide is provided with mechanism for traversing the slide and the tools thereon in directions lengthwise of the lathe bed; and wherein a work piece is engaged and supported against disalignment caused by transverse thrusts of the cutting tool; a back rest, preferably a roller rest being mounted on a carriage which is shiftable lengthwise of the lathe bed.

Such conventional lathes have long been used for turning shaft bearings to predetermined lengths and diameters. Usually, the part of the shaft where the completed journal bearing is to be located has been previously machined to produce a cylindrical strip or band-like area. This area is employed in the final turning operation as a track against which the back rest bears to support the work while the journal is being turned or finished by the usual lathe tools.

It is an object of my present improvement to provide means whereby the back rest that supports the work can be more easily and quickly moved along the lathe bed to suit the location of such preturned area on a given work piece, and to enable the operator to more quickly and easily locate the back rest in relation to new areas, thereby saving a considerable amount of time in producing turned bearings on engine crank shafts.

Another object is to arrange and construct the base of the back rest, where it rests upon the ways of the lathe bed, so that the longitudinal feed screws and their associated driving mechanisms, which heretofore have been necessary for moving the conventional back rest along the lathe bed, are dispensed with. By that means the design and construction of the lathe is simplified and its cost accordingly reduced because no special traversing screw and mechanism are employed for shifting the back rest to any desired situation along the ways of the lathe bed.

A still further object is to provide a back rest with its base so arranged in relation to the co-operating tool-carrying slide that the latter, when traversed lengthwise of the lathe in either direction, will engage the back rest base or housing and slide the back rest along the ways of the bed to locate the back rest rollers or bearings at any turned area on the journal which is to be machined in the lathe. Thus the longitudinal feed mechanism of the tool carriage is utilized for locating the back rest, in addition to performing the usual tool carriage functions.

A still further object is to provide such an arrangement wherein the tool slide, after having thus brought the back rest carriage into position will thereafter be capable of a limited traversing movement in a direction lengthwise of the bed while the back rest carriage remains immovable. This last arrangement is to enable the operator to give the tools a limited feeding movement lengthwise of the lathe bed, independently of the back rest carriage, after having brought the back rest carriage to its located position as above described.

With the foregoing and certain other objects in view, which will appear later in the specifications, the invention comprises the devices described and claimed and the equivalents thereof.

In the accompanying drawing

Figure 2:
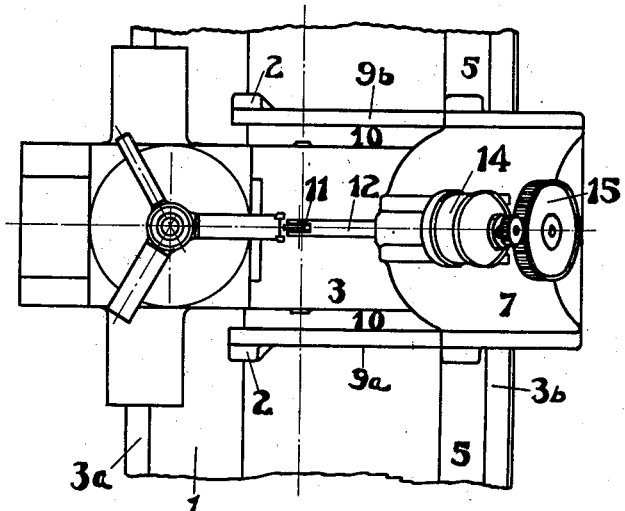
Fig. 2 is a top plan view of the parts shown in Fig. 1.

My improvement is applicable to a conventional setting for a lathe of the class indicated in the drawing, where numeral 1 designates the lathe bed having ways 3a, 3b for the usual tool slide 3, on which is mounted, by turret or otherwise, one or more tools 4.

The cross feed mechanism for the tool slide is omitted from the illustrations, because the manner of feeding the tools 4 to the work W is not an essential feature of my present improvement.

The tool slide 3 extends from the front ways 3a on the lathe bed to the back ways 3b in the usual manner, and longitudinal movement of tool slide 3 is accomplished by means of the usual feed screw 6 and its appropriate operating mechanism, which is not a part of my present improvement.

Figure 1:
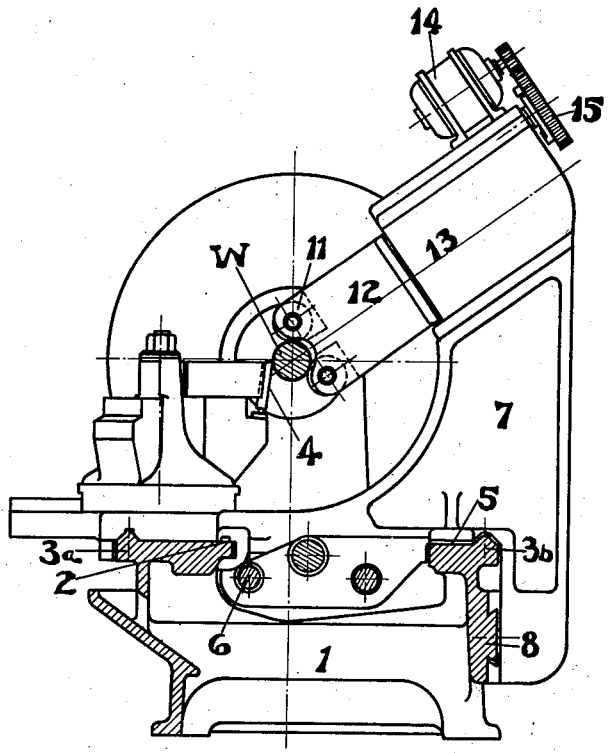
Fig. 1 is a vertical transverse cross-section of a lathe bed with my improved arrangement of tool carrying slide and back carriage thereon, shown in position for turning the journal of a work piece.

A back rest carriage embodying my improved design is designated as 7. It is slidable on back ways 5, as shown in Fig. 1, on front ways 2, and also on an auxiliary way 8 at the back of the lathe bed, below the ways 5, to provide an additional guide and supporting means for the base portion of the back rest.

Figure 3:
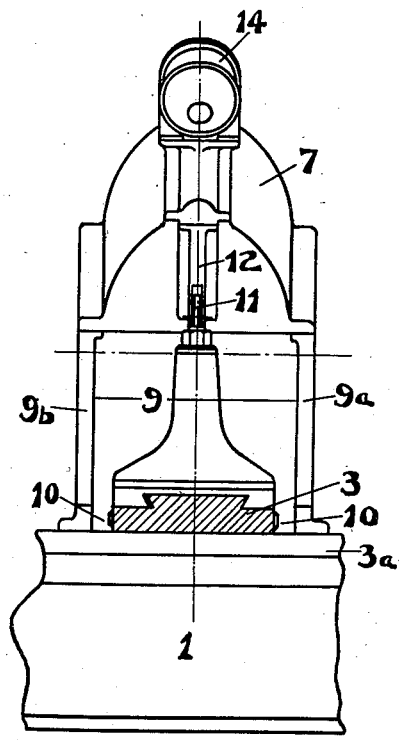
Fig. 3 is a diagrammatic view, in elevation, showing the back rest carriage and tool holder as they appear when viewed from the left, that is to say, in the direction of the arrow, Fig. 1.

I term the lower part of carriage 7, by which the above-mentioned ways 2, 5, 8, are engaged, the base portion of the back rest carriage. This base portion is formed with an opening 9 of appropriate width to receive the conventional tool slide 3, as shown in Figs. 2 and 3, allowing the tool slide to have limited traversing movements lengthwise of the lathe bed along the usual ways 3a, 3b without moving the back rest carriage 7. The spaces for such traversing movements are indicated at 10, 10, Fig. 2.

The base is bifurcated at opening 9 and has two forward extensions or sills, 9a and 9b, which like the walls of opening 9 are spaced apart farther than the width of slide 3.

The tool slide 3 can be moved by means of the usual feed screw 6 lengthwise of the bed in either direction to the extent of the clearances 10, 10 without engaging or moving the carriage 7; but upon still further traversing, the slide 3 will engage a sill 9a or 9b and shift the back rest carriage 7 to any different pre-selected location along the length of the bed.

The purpose of such shifting of the back rest carriage will now be explained.

A work piece W, which may be a journal bearing on an engine crank-shaft, is assumed to have been previously formed with a conventional turned circular band to present a fair bearing area or "track" for rollers 11 or for equivalent back rest members. Such members are carried in a plate 12 slidable in ways 13 provided in the back rest carriage 7. Slide plate 12 may be actuated by a motor 14 and suitable gearing 15.

When rollers 11 and tools 4 are in working position, shown in Fig. 1, they keep the work W supported coaxially with the lathe centers or drive chucks, as the case may be, for accurate machining.

Differently designed shafts may have their preturned bands or back-stop tracks located at various places along their lengths. Consequently the rollers 11 require to be shifted lengthwise of the lathe bed to suit shafts of different longitudinal dimensions.

Operation of feed screw 6 will cause slide 3 to travel lengthwise of the bed. The slide, upon engaging the side walls of the opening 9, or the sills 9a or 9b, of the carriage 7, will operate to move the carriage and rollers 11 into any desired new position along the length of the bed to suit the location of a preturned bearing area or band on a new work piece. The operator, having thus located the rollers 11 in their new longitudinal position by means of feed screw 6 and tool slide 3, feeds the rollers 11, by means of motor 14 and gearing 15, into bearing engagement against the new work piece W, as shown in Fig. 1.

The cutting tools 4 are then advanced in the usual way into the work. The tools 4 may be almost as wide as the length of the journal to be turned, but usually are required to have some small feeding movement to the right or left, that is, lengthwise of the lathe bed, in order to produce fillets or collars at the ends of the journals, and to clean the cut throughout the whole length of the journal. Such limited tool-feeding movement to the right or left is effected by the feed screw 6, which moves the tool slide 3 in the spaces indicated at 10, 10, Fig. 2, without moving the back rest carriage 7, or disturbing the location of its work-supporting rollers 11.

By the means above described the shifting of the back rest rollers lengthwise of the lathe bed from one preturned or "spotted" journal area to another is accomplished by the usual manipulations of the tool slide as in the conventional operation of lathes that are not equipped with roller or like back rests.

The back rest housing 7 does not employ any motive power or shifting mechanisms for its own adjustment lengthwise of the bed, nor any means for clamping it to the bed when in operation. Therefore the design is greatly simplified and the cost of the entire mechanism is greatly reduced as compared with the cost of self-powered back rest housings. Moreover the rate of production of the lathe is materially increased.

Having thus described my invention, what I claim and desire to secure by Letters Patent is:

1. In a lathe comprising a bed with front and back ways supporting a tool slide traversable lengthwise of the bed and carrying a tool holder; additional front ways and back ways on said bed; a back-rest mounted on said additional ways, the base portion of the back-rest having an opening into which the tool slide extends and presenting clearance space wherein the tool slide may be traversed a limited distance without moving the back-rest; portions of the back-rest being arranged for engagement by the tool slide upon termination of such limited traverse and for imparting identical traverse to the back-rest when further traverse is imparted to the tool slide.

2. The combination with a lathe including a tool slide and means for traversing the same lengthwise of the lathe bed; a back-rest carriage mounted on the bed independently of the tool slide and independently shiftable lengthwise of the bed; said back-rest carriage having its base portion formed with an opening; sills extending from said base at the sides of said opening and across the lathe bed, said sills receiving the tool slide between them with sufficient clearance to allow the slide a limited amount of traversing movement without moving said back-rest.

FREDERICK S. FLOETER.